(No Model.)
A. L. HAHL.
VELOCIPEDE.
No. 502,717. Patented Aug. 8, 1893.
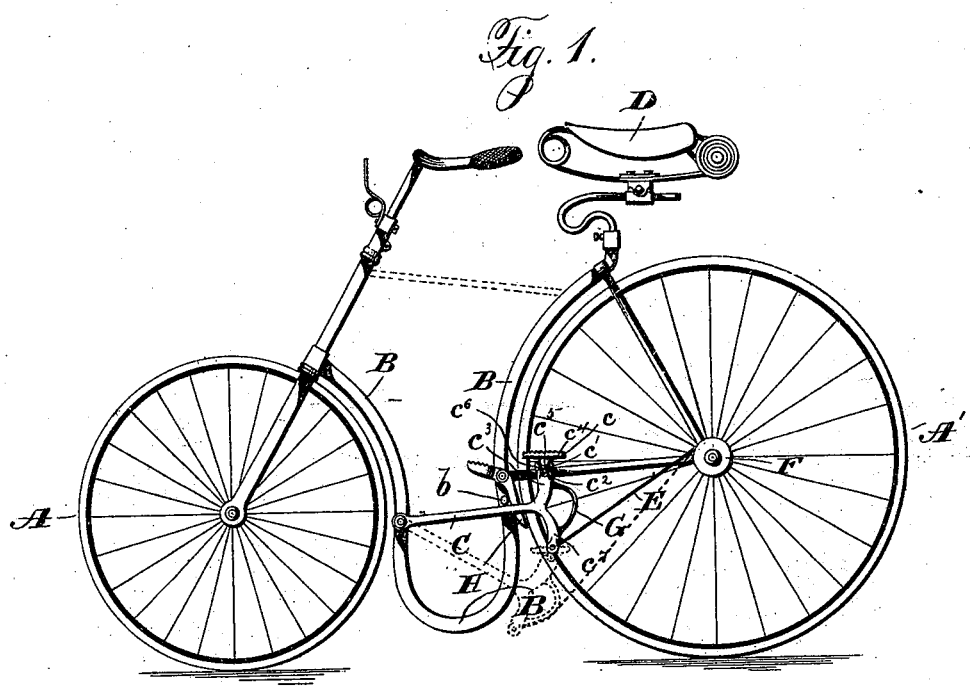
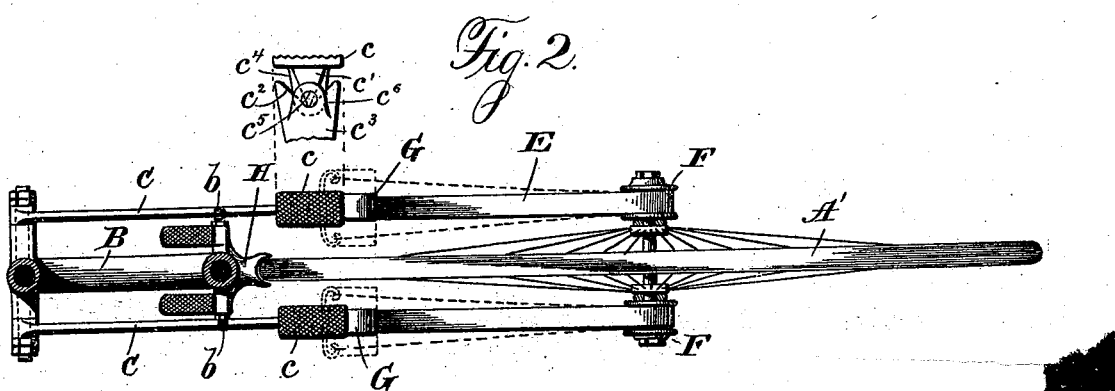
Witnesses:
Jas. E. Hutchinson.
Henry C. Hazard.
Inventor.
Augustus L. Hahl
by Kindle & Russell
his attorneys

UNITED STATES PATENT OFFICE.

AUGUSTUS L. HAHL, OF CHICAGO, ILLINOIS.

VELOCIPEDE.

SPECIFICATION forming part of Letters Patent No. 502,717, dated August 8, 1893.

Application filed June 24, 1892. Serial No. 437,921. (No model.)

*To all whom it may concern:*

Be it known that I, AUGUSTUS L. HAHL, a citizen of the United States, residing at Chicago, in the county of Cook, and in the State of Illinois, have invented certain new and useful Improvements in Velocipedes; and I do hereby declare that the following is a full, clear, and exact description thereof, reference being had to the accompanying drawings, in which—

Figure 1 shows, in side elevation, a bicycle provided with my invention; Fig. 2, a plan view of the same with the saddle, the front wheel and the forward portion of the frame removed.

Letters of like name and kind refer to like parts in each of the figures.

The object of my invention has been to provide an improved velocipede, and to this end my invention consists in certain new and improved driving and brake devices constructed, arranged and combined with the parts of a velocipede, as hereinafter specified.

While in the drawings I have shown only a bicycle provided with my invention, I desire it to be understood that such invention is equally applicable, and is intended to be applied to tricycles, and other forms of velocipedes.

In the drawings, A and A', designate, respectively, the front and rear wheels, and B, designates the connecting frame, which can be of any desired form or construction. As shown, it is like that employed in the well known bicycle for ladies' use, having the downward bend between the wheels, but I do not limit myself to this special form. Any other having a part or arm situated well down and just to the rear of the front wheel could be used, instead.

My special purpose has been to make my wheel driving and brake devices, suitable for and easily applicable to the various kinds of velocipedes, as constructed for the use of either sex, and it will be found that this purpose or end has been well attained, by constructing and arranging said devices, as shown in the drawings, and described hereinafter.

Pivoted to the front part of the frame at a point low down and close to the front wheel, are the two pedal levers C, C, which, from their pivotal ends, extend rearward on opposite sides of the frame B and the rear wheel A', to points where they are within easy reach of the feet of the rider seated in saddle D above such wheel. The pedals $c$, $c$, as the levers have only a swinging motion, need not be rotary ones, but are merely made to rock. Preferably, in order to avoid friction, they are supported upon the levers by knife-edge bearings, as indicated in the drawings. The bearing for each pedal consists of a V-shaped piece $c'$, on the under side of the foot piece, and having its apex engaging the bottom of a groove $c^2$ in the top of an arm $c^3$, which extends upward from the rear end of the lever. Such groove, while being V-shaped, like the piece $c'$, has its sides at a greater angle with reference to each other. To keep the knife edges in place, and prevent their being jumped out of the grooves in which they rock, the foot pieces can be provided with ears $c^4$, $c^4$, extending downward and engaging pins $c^5$, $c^5$, on upwardly extending lugs $c^6$, $c^6$, on the opposite sides of the arms $c^3$, $c^3$, such pins being in line with the axes of the rocking motion of the pedals. The arms $c^3$, $c^3$, on the pedal levers, project upward far enough to bring the pedals above the level of the lever pivots, and above a line between the latter and the parts, upon which the bands or straps E, E, attached to the pedal levers, are wound. As indicated in the drawings, such parts are drums F, F, which are to be of any of the ordinary and well known constructions of such devices, which are connected with the axle or hub of the wheel to be driven, so as to turn the same forward, as the bands are pulled to rotate the drums, and are turned back by springs to wind the straps up again, when the latter are released. As the manner of constructing such drums and connecting them with the wheel, is well understood, I need not describe or show the same herein, as it can be varied as desired, without departure from my invention. In order that there may be no lost motion, and that each pedal lever may pull the respective band or strap rapidly forward, as it begins to swing down, said band or strap is carried downward and forward from the upper side of its drum, and attached to the lower end of a downwardly projecting arm $c^7$ on the pedal lever, at a point well below a line joining the lever pivot, and the part of the drum from which the strap runs to the lever. With this construction, the point of connection of the strap or band with the lever is sure to travel rapidly away from the drum, at the first movement of the lever, as it would not if the strap or band were carried straight to the lever, and connected therewith at a point at or near the said line between the drum and the lever pivot.

The frame B is, of course, to have some shoulder or stop, such, for instance, as that shown at $b$, to engage each lever and limit the upward swing of the same, as the respective strap or band is being wound back upon its drum.

By placing the pedal upon the upwardly extending arm of each pedal lever, so as to raise it above the level of the lever pivot, when the lever is in elevated position, I cause all the necessary travel of the pedal, as the lever is given a full driving stroke, to be nearly in a straight line up and down. Such travel is first slightly backward, and then slightly forward, and is not all in one direction. The result is that the foot on the pedal need have but little movement to the front or rear, as the pedal is depressed or rises, but travels nearly straight up and down. Such a movement has been found to be much easier and less fatiguing than one which is entirely forward and downward, and backward and upward, like that which is necessary where the pedal is lower down, so as to be at or below the height of the lever pivot. On the rear end of each pedal lever, there is a shoe G, which has a strap engaging surface extending upward and rearward, from a point at or near the place of attachment of the strap to the arm or extension $c^7$ on the lever. Such surface is, preferably, but not necessarily, a curved one, as shown. With the shoe G so constructed that its upper portion projects farthest to the rear of the lever, as the latter is depressed, the strap, being engaged and bent over the shoe, as indicated in dotted lines, will, as the lower end of the lever stroke is approached, be pulled out faster, so as to increase the speed of rotation of the drum, and the wheel with which the latter is connected. Another function of shoe G is to keep the strap well away from the heel of the foot on the pedal, when the lever is forced down. While I consider this device desirable, for the two reasons above indicated, I do not limit myself to its use in connection with the pedal lever, as the latter can be successfully used without it. The two arms $c^3$, $c^7$, can easily be made of such relative shape and length as to keep the strap out of the way of the heel of the rider.

Instead of having the strap, wound around either drum, extending from the latter to the respective pedal lever, I contemplate, where desired, having a connecting rod or strap, of metal, or other material, forming a connection between the lever and the flexible part of the band or strap, which is to be wound upon the drum. I also contemplate using, instead of a single broad strap, two narrow ones or cords, which, as indicated by dotted lines in Fig. 2, could be attached at two separate points on each side of a pedal lever, and be wound, respectively, upon the inner and outer portions of the respective drum.

Pivoted to the frame B, close to the forward side of the rear wheel A', is the brake H, consisting of the lower portion which is to be shaped, so as to best engage the wheel tire, and the forked upper portion extending forward on each side of the frame. The arms of the fork, situated within reach of the feet of the rider occupying the saddle, are preferably, provided on their upper sides, with roughened surfaces to afford a good hold for the foot.

While it is not necessary to have a foot hold on each side of the machine, so that either foot of the rider could be used to engage the brake, I prefer to have the construction shown and described, as I intend to use the brake, also, as a step, to aid the rider in dismounting, and he might want to dismount on different sides of the machine at different times.

With the brake arranged as described, the rider can easily apply it to check the speed of the machine by pressing either foot upon the corresponding fork arm, or, when going at full speed, he can stop his machine and dismount at the same time, by simply using one of such arms as a step, upon which his weight is pressed, as he raises himself from the saddle preparatory to stepping off, or jumping to the ground. When he wants to stop and dismount, he has, then, no brake to be operated by the hand before the dismounting, since in performing the latter operation, he at the same time, by the pressure of his foot necessarily applies the brake. The latter can be either weighted, so as to stand normally away from the wheel tire, or it can be provided with a spring to keep it in such position.

My wheel driving devices, hereinbefore set forth and shown in the drawings, are simple, cheap, and strong in construction, not liable to be broken or got out of order during use; and, as indicated hereinbefore, are adapted to utilize, to the best advantage, all the foot power applied to the pedals, throughout the whole stroke of the pedal levers, and to insure the most easy and comfortable movement of the feet and legs of the rider, as the levers are depressed and raised; while, with the projecting strap engaging shoes on the rear ends of the levers, the speed at which the straps are pulled out and the wheel driven, can be increased as the levers approach the limit of their downward throw. This latter part of the driving devices, I consider quite desirable, where great speeding is wished.

Having thus described my invention, what I claim is—

1. As a means for driving bicycles and the like, in combination with the strap drum, and a pivoted pedal lever having its free end extending toward the drum, the strap connected with the lever and drum, and a projecting shoe on the lever, above and away from the point of attachment of the strap, to engage and bend the strap about it only during a portion of the movement of the lever, substantially as and for the purpose specified.

2. As a means for driving bicycles and the like, in combination with the strap drum, and a pivoted lever having its free end extending toward the drum, the strap connecting the drum and lever, and extending downward and forward from the drum to the lever, the pedal standing in, or substantially, in, a vertical line above the point of attachment of the lever and strap, and the projecting shoe on said lever between said point of attachment, and the pedal, to engage and bend the strap about it only during the concluding portion of the movement of the lever, substantially as and for the purpose set forth.

3. In a velocipede, in combination with the frame and the wheel to be driven, a strap drum for driving such wheel, a lever pivoted at its forward end in advance of the wheel axis and extending rearward, the strap extending from the drum downward and forward and attached to the lever at a point, which, when the latter is raised, is below a line between the lever pivot and part of the drum from which the strap passes to the lever, a suitable foot piece or pedal on the lever, and a projecting shoe on the latter between the foot piece and the point of attachment of the strap to the lever, and away from said point of attachment, to engage the strap only during a portion of the downward movement of the lever, substantially as and for the purpose shown.

4. In a velocipede, in combination with the frame and one of the wheels, the combined brake and step consisting of a pivoted piece having a portion to engage the wheel tire and the two arms to receive the brake applying downward pressure, each situated, so that it will be within reach of one of the feet of the rider, and shaped so as to form a step to support the foot, when it has been depressed by the latter to apply the brake, substantially as and for the purpose shown.

In testimony that I claim the foregoing I have hereunto set my hand this 11th day of June, A. D. 1892.

AUGUSTUS L. HAHL.

Witnesses:
  L. BRINCKERHOFF,
  PORTER B. FITZGERALD.